INVENTOR.
SEYMOUR MERMELSTEIN

BY Peter Xiarhos

AGENT.

United States Patent Office 3,484,093
Patented Dec. 16, 1969

3,484,093
ARTICLE HOLDING APPARATUS
Seymour Mermelstein, Burlington, Mass., assignor to Sylvania Electric Products Inc., a corporation of Delaware
Filed July 3, 1967, Ser. No. 650,951
Int. Cl. B25b 1/00
U.S. Cl. 269—21                                    10 Claims

ABSTRACT OF THE DISCLOSURE

Apparatus for holding a work piece in position by means of a vacuum. A cylindrical piston having a centrally-located vacuum admission hole therein is slidably positioned within a conforming cylindrical opening in a plate member. An annular resilient ring is disposed in a circumferential groove provided at the upper extremity of the piston. To hold a work piece in position, the piston is moved upwardly from the bottom of the opening under the force of air pressure, the work piece is positioned on the resilient ring, and a vacuum is established via the vacuum admission hole in the region intermediate to the surface of the upper end of the piston and the work piece. As a result, suction is established between the surface of the upper end piston and the work piece, and the work piece is held in position.

BACKGROUND OF THE INVENTION

The present invention relates to apparatus for holding articles in position and, more particularly, to apparatus employing a vacuum for maintaining articles in position.

Many devices are known for maintatining one or more articles or work pieces in position so that various operations may be performed thereupon. Some typical examples of such devices include clamps, vises, electromagnetic holders, and vacuum holders. A common variety of vacuum holder includes a valve member which controls the opening and closing of one or more apertures over which a work piece or a part of a work piece is positioned and through which a vacuum is established for holding the work piece or part of the work piece in position. More particularly, the work piece or part of the work piece is held against a surface of the work holder by the suction established by the condition of the vacuum.

In one form of the above type of vacuum holder, the valve member is physically actuated by the work piece itself to initiate and establish the desired vacuum and suction. In other forms of the above type of vacuum holder, the vacuum is initiated and suction established without any actual physical contact between the work piece and the valve member. For example, the valve member may be actuated by changes in air pressure brought about by the placing of a work piece over one or more of the apertures.

A general disadvantage of the vacuum holders of the above-described types is that in many instances a work piece cannot be accurately positioned on or, once held in position thereby, be easily removed from such vacuum holders without difficulty. That is, once a work piece is positioned on a vacuum holder of the above-described type, a vacuum is substantially immediately established and a work piece is quickly retained in position by suction. Because of the quick retention of the work piece, the position of the work piece cannot be readily altered or corrected without first releasing the suction. Since the suction established by each of the holders of the above types is generally released by physically removing the work piece from its position on the holder, it is quite likely that the work piece, particularly if small, thin, or fragile, will be damaged.

Another disadvantage of some of the above-described holders, particularly those utilizing valve members which are actuated by direct physical contact with the work piece, is that such valve members must often be adjusted to accommodate the particular size or thickness of the article or work piece to be retained in position. Still another disadvantage of many of the above described holders is the general inability of the holders to hold warped or cambered work pieces in position without creating undesirable leakage conditions and burdens on the vacuum system.

SUMMARY

The disadvantages and difficulties associated with the prior art work holders, as described hereinabove, are eliminated in the present invention by a pressure and vacuum controlled article holder. Briefly, the article holding apparatus of the invention includes an assembly having a chamber therein. An opening at one end of the chamber is constructed to have a smaller area than an opening at the opposite end of the chamber. A piston having a configuration substantially conforming to the chamber and including a passage therethrough and a contact surface at an end thereof corresponding to the chamber opening having the larger area is slidably disposed within the chamber.

When it is desired to retain an article in position, the piston is moved within the chamber from a first position at one end of the chamber to a second position at the opposite end of the chamber by a means operable to apply pressure to the piston. While the piston is in the second position and after an article has been positioned on the contact surface of the piston, a condition of reduced pressure is established in the passage in the piston by a pressure reducing means whereby suction is established between the article and the piston. The suction retains the article in position on the contact surface of the piston. A particular feature of the invention is the inclusion of a means for preventing the pressure reducing means from affecting the passage in the piston when the piston is in the first position.

DESCRIPTION OF THE PREFERRED EMBODIMENT

Figure 1:
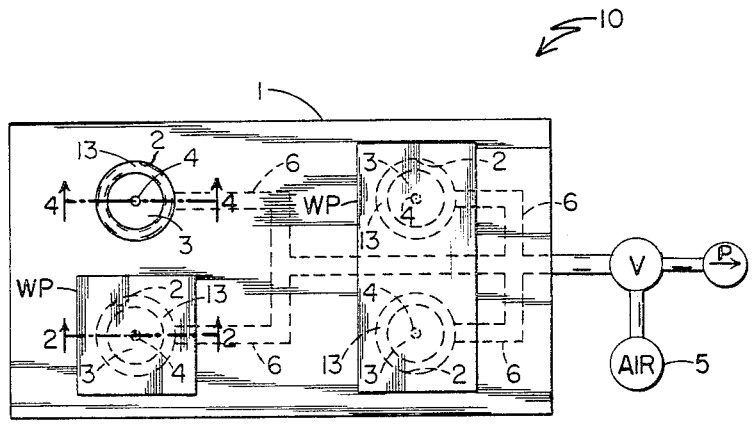
FIG. 1 is a plan view of a work holder in accordance with the present invention illustrating several individual units or work stations of the work holder for retaining one or more work pieces in position.
Figure 2:
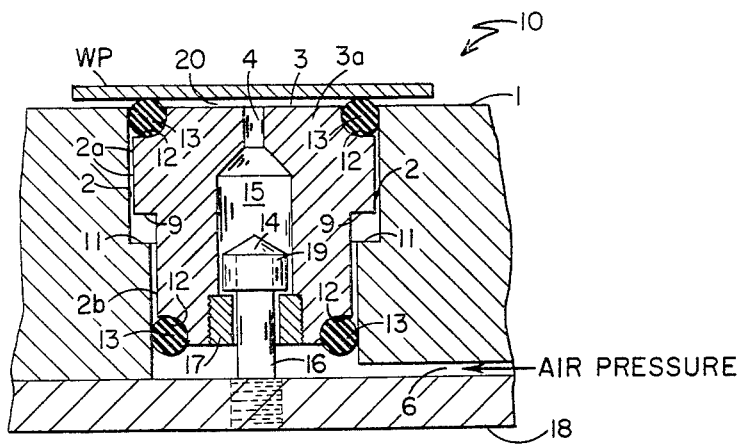
FIG. 2 is a cross-sectional view taken along the line 2—2 in FIG. 1 illustrating the position of a single piston of the invention after pressure has been applied to the piston to cause the piston to move from a first position to a second position and after a work piece has been positioned over a single work station of the work holder of FIG. 1.

Referring to FIG. 1, there is shown a plan view of a work holder 10 of the present invention. As shown in FIG. 1, and in greater detail in FIG. 2, a plurality of openings 2 are provided in a body or plate member 1. A piston 3, having a shape substantially conforming to the shape of the opening 2, and further having a passage or vacuum admission hole 4 therein, is located within each opening 2. As shown in FIGS. 1 and 2, each vacuum admission hole 4 communicates with a vacuum pump P and a source of air 5 under pressure via an associated channel or manifold slot 6 located at the bottom of the plate member 1 and opening into each opening 2. The manifold slots 6 are coupled in common both to the vacuum pump P and to the source of pressurized air 5 via a manually-operated two-position valve V. An individual work piece or article WP to be held by the holder 10 of FIG. 1 may be located over a single opening 2 only, or over a plurality of openings 2, as indicated in FIG. 1.

The detailed construction of a single piston assembly and work station of the invention is shown in detail in FIG. 2. The view of FIG. 2 is taken along the line 2—2 in FIG. 1. As shown in FIG. 2, the walls of the opening 2 define an upper chamber or cavity 2a and a lower chamber or cavity 2b in which the piston 3 is slidably positioned. Also, as shown in FIG. 2, the area of the opening of the upper chamber 2a at the upper surface of the plate member 1 is greater than the area of the opening of the lower chamber 2b at the bottom surface of the plate member 1.

The piston 3 is stepped at a middle position thereof in such a manner as to generally conform with the opening 2. When the piston 3 is at its lowest position, noting FIG. 4, a surface 9 thereof extends for a slight distance above a surface 11 of the plate member 1. Although the piston 3 is indicated as having a cylindrical shape in the drawings, it is to be understood that the piston 3 may have any other suitable contour or configuration, for example, a rectangular or conical configuration. In such event, the opening 2 is correspondingly rectangular or conical also. However, regardless of the general configuration of the opening, the area of the opening at the upper surface of the plate member should be greater than the area of the opening at the lower surface of the plate member.

At the upper and lower extremities of the piston 3, a pair of circumferential annular perimetric grooves 12 are provided in which a pair of toroidal cooperating resilient rings 13, typically rubber O-rings, are tightly secured, as by bonding. The upper and lower resilient rings 13 each establish a friction fit against portions of the walls of the opening 2. If desired, the resilient rings 13 may be formed integrally with a body portion 3a of the piston 3 and of the same material as the body portion 3a, for example, rubber.

The upward movement of the piston 3 along the opening 2, that is, the stroke of the piston 3, is determined by means of a captive stud 14 threadably secured to a supporting plate 18, and by means of a sleeve 17 threaded within an opening in the bottom of the piston 3. As shown in FIG. 2, the length of the stud 14 is established such that at the uppermost position of the piston 3, the upper end of the piston 3 extends for a short distance above the upper surface of the plate member 1.

The operation of a single work station of the work holder 10 to hold a single article or work piece WP in position will now be described in detail. Under vacuum, the piston 3 assumes the position shown in FIG. 4. The piston 3 is in its lowermost position and rests on its lower resilient ring 13 on the supporting plate 18. At this particular instant, the opening of the manifold slot 6 is sealed off by the lower resilient ring 13. To move the piston 3 upwardly, air pressure from the source of pressurized air 5, FIG. 1, is applied to the manifold slot 6 by an operator via the manually-operated two-position valve V. The force of the air pressure against the lower resilient ring 13 is sufficient to cause the piston 3 to start moving upwardly along a shank portion 16 of the captive stud 14.

As the air pressure is admitted both to the region below the piston 3 and the walls of a recess 15, in which the captive stud 14 is located, the piston 3 is driven from its lowermost position on the supporting plate 18 to its uppermost position, as limited by the captive stud 14 abutting the sleeve 17, noting FIG. 2. The air pressure admitted to the vacuum admission hole 4 via the recess 15, in addition to aiding the upward movement of the piston 3, also serves to eject any particles of foreign matter from the vacuum admission hole 4 which may have been undesirably drawn into the vacuum admission hole 4 as the result of prolonged or extensive operation of the work holder 10.

As shown in FIG. 2, at the top of the stroke of the piston 3, the upper resilient ring 13 extends a slight distance above the surface of the plate member 1. With the piston 3 in the position indicated in FIG. 2, the work piece WP can be located by an operator above the opening 2 on the exposed contact surface of the upper resilient ring 13. Positioning of the workpiece WP establishes a zone or depression 20 bounded by the bottom surface of the work piece WP, portions of the upper resilient ring 13, and the top surface of the piston body portion 3a. Since no vacuum or suction is present at this particular time, the work piece WP can be carefully and accurately placed in its desired position over the opening 2 on the upper resilient ring 13. If desired, guide members may be provided on the surface of the plate member 1 to insure that the work piece WP is maintained within certain desired boundaries.

It may be noted that although some air pressure is directed via the recess 15 through the vacuum admission hole or passage 4 onto the work piece WP, the amount of air pressure applied to the vacuum admission hole 4 is usually insufficient to cause a work piece WP to be dislodged from the upper resilient ring 13. However, in the event that an extremely thin or light work piece is to be maintained in position, in which case the presence of even a slight amount of air pressure is deemed undesirable, a manually-operated valve having a third position, a vent position, in addition to the two positions of the valve 7 of FIG. 1, may be utilized whereby atmospheric pressure only is present in the vacuum admission hold 4 when the valve is operated in the vent position. In such instance, the friction existing between the upper and lower resilient rings 13 and the walls of the opening 2 is sufficient to maintain the piston 3 in its uppermost position as indicated in FIG. 2.

When the work piece is placed in its final desired position over the opening 2 in the plate member 1 on the upper resilient ring 13, the valve V is moved to its second position whereby the vacuum pump P is rendered operative to evacuate the air present in the manifold slot 6, the portion of the opening 2 beneath the piston 3, the recess 15, the vacuum admission hole 4, and the zone 20. Air present between the piston 3 and the walls of the opening 2, however, is not evacuated. As a result of the operation of the vacuum pump P, a vacuum is created between the upper surface of the piston 3, and the work piece WP is pulled against the upper resilient ring 13 and the piston body 3a by suction. At the same time as the vacuum is applied to the region 20, the vacuum applied to the lower effective area of the piston 3 causes the piston 3 to be pulled back slightly into the upper chamber 2a of the opening 2 until the work piece WP abuts the upper surface of the plate member 1, noting FIG. 3. The speed of the downward movement of the piston 3 is somewhat slowed by the friction of the upper and lower resilient rings 13 bearing against the walls of the opening 2.

Due to the presence of air between the surfaces 9 and 11, which air acts upwardly against the surface 9 of the piston 3, once the work piece WP is held against the piston 3, the piston 3 cannot break away from its suction hold on the work piece WP. Therefore, the piston 3 is maintained in the position indicated in FIG. 3. Also, as shown in FIG. 3, when the condition of suction is established in the upper region or zone 20, the upper resilient ring 13 is slightly deformed by the suction and the work piece WP rests on the upper surface of the plate member 1.

Figure 3:
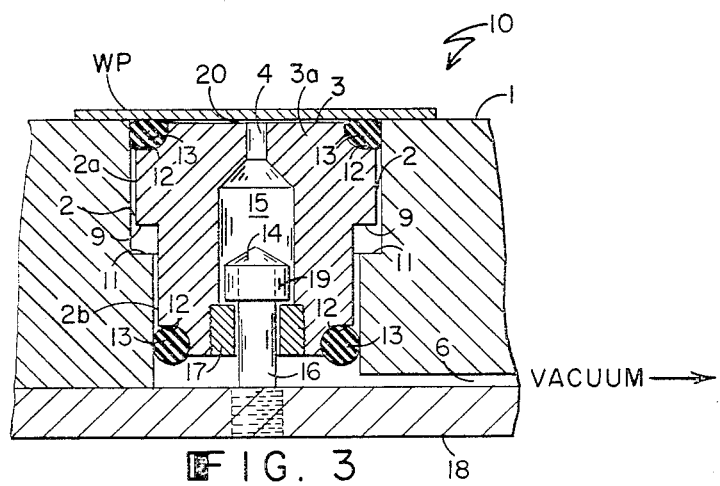
FIG. 3 is a cross-sectional view illustrating the position of the piston of FIG. 2 while a work piece is being retained in position on the piston and while the piston is under a condition of reduced presure.

Once the work piece WP is held in position as shown in FIG. 3, any number of desired operations may be performed thereupon. To release the work piece WP, the valve V is operated to its first position to release the previously-applied vacuum and to re-apply air pressure to the piston 3. Re-application of the air pressure to the piston 3 causes the piston 3 to move upward slightly from its position in FIG. 3 to a level above the surface of the plate member 1 as described hereinabove and as shown in FIG. 2. Also, the recess 15, the vacuum admission hole 4, and the region 20 are again filled with air under pressure. Movement of the piston 3 above the surface of the plate member 1 causes the vacuum in the region 20 and the accompanying suction between the work piece WP and the upper surface of the piston 3 to be released. The work piece WP can then be removed without fear of breakage or other damage thereto.

Figure 4:
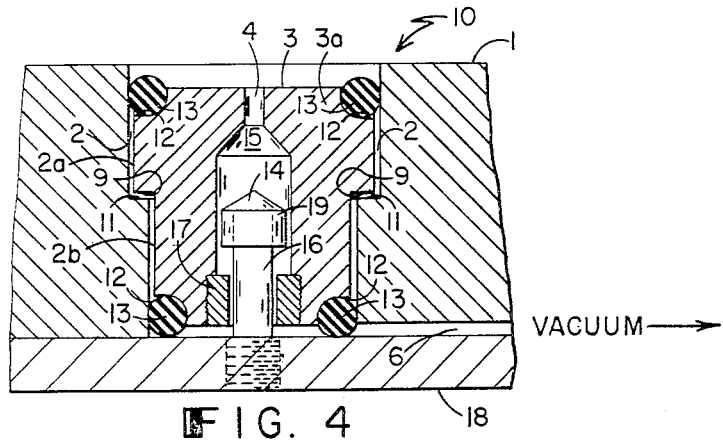
FIG. 4 is a cross-sectional view taken along the line 4—4 in FIG. 1 showing the position of the piston when a work piece is not present over a work station of the work holder of FIG. 1 and vacuum is applied to the piston.

In the above discussion, it has been assumed that a work piece is to be secured in position above an opening 2 in the plate member 1. However, in the event a work piece is not present on one or more of the openings 2 provided in the plate member 1, it has been found desirable to prevent the vacuum pump P from unnecessarily evacuating any portion of each of the openings 2 and imposing a burden on the vacuum pump P. FIG. 4 illustrates how the construction of the present invention prevents such unnecessary evacuation. The sectional view of FIG. 4 is taken along the line 4—4 of FIG. 1. As shown in FIG. 4, when no work piece is present over the opening 2, and a vacuum is applied to the bottom of the piston 3, via the channel or manifold slot 6, the lower resilient ring 13 is pulled against the opening of the manifold slot 6 and seals off the opening of the manifold slot 6. In this manner, the opening 2 is sealed off from the manifold slot 6 and the vacuum pump P.

The vacuum holder 10 of the figures may be constructed from well-known materials. For example, the plate member 1 and the supporting plate 18 may be constructed of plastic or metal, for example, aluminum. The piston body 3a is preferably constructed of a light material, such as rubber, plastic, or aluminum. The sleeve 17 may be of stainless steel. Although the work holder 10 of the figures assumes a vertical orientation, it is to be understood that such work holder is capable of effective operation in any orientation.

It will now be apparent that a novel article holding apparatus has been disclosed in such full, clear, concise, and exact terms as to enable any person skilled in the art to which such apparatus pertains to construct and use the same. It will also be apparent that various changes and modifications may be made in form and detail by those skilled in the art without departing from the spirit and scope of the invention.

What is claimed is:

1. Article holding apparatus comprising:
   an assembly having a chamber therein, an opening at one end of said chamber having a smaller area than an opening at the opposite end of said chamber;
   a piston having a configuration generally conforming to said chamber slidably disposed within said chamber and operably movable from a first position at said one end of said chamber to a second position at said opposite end of said chamber, said piston also having a passage therethrough and a contact surface at an end thereof corresponding to the chamber opening having the greater area;
   means operable to apply pressure to the piston to cause the piston to move within said chamber from said first position to said second position;
   pressure reducing means operable to establish a condition of reduced pressure in said passage when said piston is in said second position whereby when an article is positioned on the contact surface of said piston while said piston is in the second position suction is established between the article and said piston thereby retaining the article in position on the contact surface of said piston; and
   said piston includes means for preventing the pressure reducing means from affecting the passage through the piston when the piston is in the first position.

2. Article holding apparatus comprising:
   an assembly having a chamber therein, an opening at one end of said chamber having a smaller area than an opening at the opposite end of said chamber;
   a piston having a configuration generally conforming to said chamber slidably disposed within said chamber and operably movable from a first position at said one end of said chamber to a second position at said opposite end of said chamber, said piston having a passage therethrough and including a body portion having a perimetric groove formed at an end region thereof, said end region corresponding to the chamber opening having the greater area, and a resilient member disposed in said perimetric groove establishing a friction fit with a portion of the walls of said chamber, said resilient member extending for a slight distance above a surface of said assembly when said piston is in said second position, the surface of said resilient member constituting a contact surface;
   means operable to apply pressure to the piston to cause the piston to move within said chamber from said first position to said second position; and
   pressure reducing means operable to establish a condition of reduced pressure in said passage through the piston when said piston is in said second position whereby when an article is positioned on the contact surface of the resilient member when the piston is in the second position suction is established between the article and the piston thereby retaining the article in position on the contact surface of the resilient member.

3. Article holding apparatus in accordance with claim 2 wherein said body portion includes an additional perimetric groove formed at an opposite end region thereof, said opposite end region corresponding to the chamber opening having the smaller area, said apparatus further including an additional resilient member disposed in said additional perimetric groove establishing a friction fit with a portion of the walls of said chamber.

4. Article holding apparatus in accordance with claim 1 wherein said piston includes a depression at said one end thereof and said contact surface surrounds said depression, the pressure in said depression being reduced via said passage when an article is positioned on said contact surface whereby suction is established in said depression thereby retaining the article in position on the contact surface of said piston.

5. Article holding apparatus in accordance with claim 1 wherein said means operable to apply pressure to the piston includes a source of air pressure.

6. Article holding apparatus in accordance with claim 1 wherein said means operable to establish a condition of reduced pressure includes a vacuum pump.

7. Article holding apparatus comprising:
   a body having an opening therethrough, the opening at one surface of said body having a smaller area than the opening at an opposite surface of said body, said body further having a channel formed in said one surface opening into said body opening;
   a supporting member on which said body is disposed;
   a piston having a configuration generally conforming to said body opening slidably disposed within said body opening and operable to be moved from a first position to a second position; said piston also having first and second coaxial passages therethrough and a contact surface at one end thereof corresponding to the chamber opening having the greater area;

means disposed in said first passage and secured at one end to said supporting member for limiting the movement of said piston to a point a slight distance above said opposite surface of said body when said piston is in said second position;

a two-position valve means communicating with said channel;

means operable when said valve means is operated in a first position to apply pressure via said channel to said piston to cause said piston to move from said first position to said second position; and means operable when said valve means is operated in a second position to establish suction in said channel in said first and second passages whereby an article is positioned on the contact surface of said piston said article is retained in position on the contact surface by the suction between the article and said piston.

8. Article holding apparatus in accordance with claim 7 wherein said piston comprises:

a body portion having a perimetric groove formed at an end region thereof, said end region corresponding to the chamber opening having the greater area; and a resilient member disposed in said perimetric groove establishing a friction fit with a portion of the walls of said chamber and constituting said contact surface, said resilient member extending for a slight distance above said opposite surface of said body when said piston is in said piston is in said second position.

9. Article holding apparatus in accordance with claim 8 wherein said body portion includes an additional perimetric groove formed at an opposite end region thereof, said opposite end region corresponding to the chamber opening having the smaller area, said apparatus further including an additional resilient member disposed in said additional perimetric groove for sealing off the opening of said channel when said piston is in said first position.

10. Article holding apparatus comprising:

an assembly having a surface;

a chamber in said assembly including a first portion having an opening in said surface and including a second portion of cross-sectional area smaller than said opening in said surface;

a piston generally conforming to said chamber and movable between a first position adjacent the end of said chamber opposite said opening and a second position adjacent the opening of said chamber;

said piston having a contact surface at the end adjacent said opening protruding beyond said surface when the piston is in the second position and lying within the chamber when the piston is in the first position;

a passageway extending through said piston in communication with the first and second portions of the chamber;

means for increasing the pressure in the second portion of the chamber whereby said piston is moved to the second position;

means for reducing the pressure in the second portion of the chamber whereby when an article is in contact with said contact surface while the piston is in the second position the article is held against the contact surface by the reduced pressure between the article and piston by way of the passageway and the piston is drawn into the chamber to a position intermediate the first and second positions at which the article abuts said surface of the assembly and whereby when no article is in contact with the contact surface the piston is withdrawn into the chamber to said first position; and said piston includes means for preventing the means for reducing pressure from affecting the passageway in the piston when the piston is in the first position.

References Cited

UNITED STATES PATENTS

| 1,384,278 | 7/1921 | Slocombe. | |
| 2,468,817 | 5/1949 | Eriksson | 279—3 |
| 3,328,042 | 6/1967 | Mallory | 279—3 |

ROBERT C. RIORDON, Primary Examiner

D. R. MALTON, Assistant Examiner

U.S. Cl. X.R.

279—3